US006795818B1

(12) United States Patent
Lee

(10) Patent No.: US 6,795,818 B1
(45) Date of Patent: Sep. 21, 2004

(54) METHOD OF SEARCHING MULTIMEDIA DATA

(75) Inventor: Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 297 days.

(21) Appl. No.: 09/609,393

(22) Filed: Jul. 3, 2000

(30) Foreign Application Priority Data

Jul. 5, 1999 (KR) .......................................... 99-26938

(51) Int. Cl.[7] .............................................. G06F 17/30
(52) U.S. Cl. ..................... 707/3; 707/2; 707/5; 707/10; 382/128; 382/305
(58) Field of Search .............................. 707/3, 5, 2, 10; 382/128, 305

(56) References Cited

U.S. PATENT DOCUMENTS

| 5,579,471 | A | | 11/1996 | Barber et al. ................ 395/326 |
| 5,642,502 | A | * | 6/1997 | Driscoll .......................... 707/5 |
| 5,872,859 | A | * | 2/1999 | Gur et al. ..................... 382/128 |
| 5,999,664 | A | * | 12/1999 | Mahoney et al. ........... 382/305 |
| 6,078,914 | A | * | 6/2000 | Redfern .......................... 707/3 |
| 6,269,361 | B1 | * | 7/2001 | Davis et al. .................... 707/3 |
| 6,278,989 | B1 | * | 8/2001 | Chaudhuri et al. ............ 707/2 |
| 6,408,293 | B1 | * | 6/2002 | Aggarwal et al. ............. 707/3 |
| 6,463,431 | B1 | * | 10/2002 | Schmitt ......................... 707/5 |
| 6,529,901 | B1 | * | 3/2003 | Chaudhuri et al. ............ 707/3 |

OTHER PUBLICATIONS

Yong Rui et al. "Relevance Feedback Techniques in Interactive Content–Based Image Retrieval" Beckman Institute and Dept. of Computer Science, University of Illinois, pp. 1–12.

Yong Rui et al. "Relevance Feedback: A Power Tool for Interactive Content–Based Retrieval" IEEE Transactions on Circuits and System for Video Technology, vol. 8, No. 5, Sep. 1998, pp. 644–655.

Ana B. Benitez et al. "Using Relevance Feedback In Content–Based Image Metasearch" IEEE Internet Computing, Jul.–Aug., 1998, pp. 59–69.

* cited by examiner

*Primary Examiner*—Thuy N. Pardo
(74) *Attorney, Agent, or Firm*—Fleshner & Kim, LLP

(57) ABSTRACT

A method of searching multimedia data is disclosed. In the present invention, weights of features in a specific image are automatically learned by grouping images stored in a search system, giving an initial weight to the grouped images to search and classify the images, determining errors from the classified results and re-sorting the error images using automatic feedback.

37 Claims, 4 Drawing Sheets

FIG.2

| round 1 | Search result using initial weights<br><br>A A B B A C C A C A ⁞ A B B A C A B A A B ...<br>I I    I I    I    ⁞II    II    II    II II |
|---|---|
| round 2 | Search result after updating weights using feedback<br>A A A B A A C A A A ⁞ C A B B A C C B B ...<br>     I      I        ⁞    II    II |
| round 3 | Search result after updating weights using feedback<br>A A A A A C A A B A ⁞ A A B B B C C B B ...<br>         I          ⁞       II |
| round 4 | Search result after updating weights using feedback<br>A A A A A A A A B A ⁞ A C B B B C C B B ... |

(I : dissimilar feedback image, II : similar feedback image)

the number of feedback images number of times of feedback

METHOD OF SEARCHING MULTIMEDIA DATA

BACKGROUND OF THE INVENTION

1. Field of the Invention

The present invention relates to a method of searching multimedia data, and more particularly to a method of searching multimedia data more accurately by setting initial weights of features in images through a feedback algorithm.

2. Background of the Related Art

Recently, the digital image signal processing technology has been developing rapidly and has been applied in many fields. Some of these fields include a search system for automatically editing only a face of a specific character in a moving picture file of a movie or drama; a security system for permitting access only to those registered in the system; and a search system for searching a particular data from an image or video detected by a detecting system. In any application field, the performance of a system essentially depends on the accuracy and speed of detecting or searching a desired object. Accordingly, various image searching methods have been proposed in the related art.

One image search system which detects a degree of similarity with an image to be searched using features such as color, texture, or shape is disclosed in U.S. Pat. No. 5,579,471 entitled "An Image Query System and Method." In a given search, the importance of a feature may vary depending upon a reference image to be searched and within one particular feature such as the color, the importance of a feature element such as the red or green color may also vary. However, this search system does not take into consideration the different importance of features or feature elements of an image to be searched.

In another searching method entitled "Virage image search engine" (www.virage.com), a user directly inputs the level of importance for features such as a color, texture and shape by assigning weight values. Although an image may be searched according to an importance of a feature using this method, it may be difficult for a user to determine the weights of features.

Therefore, Yong Rui in "Relevance feedback techniques in interactive" SPIE Vol.3312, discloses a method in which images similar to a reference image are found and the importance of features or weights for features are automatically obtained by calculating the similarities among the found images. However, the weight importance information is not maintained after a search for a specific image is finished and must be calculated for each image search, even for a same image.

Finally, "Using relevance feedback in content based image metasearch," IEEE Internet Computing, pp. 59~69, July~August 1998 discloses a technology in which an image is automatically fed back when searching the image to learn the weight for features in the image. Thereafter, the learned weights and the image are tabled. In the above system, although images learned by feedback may be effectively searched, an image that has not been learned cannot be effectively searched even if weights are used.

Accordingly, "Using relevance feedback in content based image metasearch" also discloses a technology in which images are grouped and a reference image that has not been learned is searched using a learned weight of another image if the learned weight belongs to the same group as that of the reference image. However, there is a limitation to an effective search of an image using the above system as the weight of features in even the same group depends on each image.

Moreover, learning the weights after a few number of feedback would deteriorate the performance of the search system and the reliability of the search results. To obtain accurate weights, more than a given number of times of feedback should be used.

SUMMARY OF THE INVENTION

Accordingly, an object of the present invention is to solve at least the problems and disadvantages of the related art.

An object of the present invention is to provide a more effective method of searching multimedia data.

Another object of the present invention is to provide a method of searching multimedia data, in which weights of features in a specific image are automatically learned by grouping all images stored in a search system, giving initial weights to the grouped images to search and classify the images, determining errors from the classified results, and re-sorting the images using automatic feedback.

A further object of the present invention is to provide a multimedia data structure for an effective multimedia data search.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method of searching multimedia data comprises grouping the multimedia data in a database of a search system; searching and classifying the grouped multimedia data using initial weights of features in the grouped multimedia data; receiving at least one feedback reference multimedia data depending on a degree of error of the classified multimedia data; and updating weights of features in the fed back multimedia data.

In another embodiment, a method of searching multimedia data comprises searching for a reference image using initial weights; receiving user feedback on similar or dissimilar images; setting group information for a corresponding class using fed back information; updating the weights using fed back data; re-searching for the reference image using the updated weights; automatically determining at least one data using a degree of error for the searched data and the set group information; feeding the determined data back; and updating the weights using the fed back data.

Also, a multimedia data structure for use in a multimedia data search according to the present invention comprises a global information which represents specific multimedia data and spatial information which represents a feature in the multimedia data, wherein weights of the features include a type weight descriptor which represents importance of the feature element, an element weight descriptor which represents importance of elements depicted in one feature, and a position weight descriptor which represents important information from the spatial information.

BRIEF DESCRIPTION OF THE DRAWINGS

The invention will be described in detail with reference to the following drawings in which like reference numerals refer to like elements wherein:

FIG. 2 shows a procedure for initiating a weight of a feature in an image using automatic feedback algorithm according to the present invention;

DETAILED DESCRIPTION OF THE PREFERRED EMBODIMENTS

Reference will now be made in detail to the preferred embodiments of the present invention, examples of which are illustrated in the accompanying drawings.

In the present invention, images which are stored in an image database are grouped and classified in advance. Here, all images may be grouped or only reference images may be grouped based upon feedback of similar or dissimilar image data from a primary search results.

Figure 1:
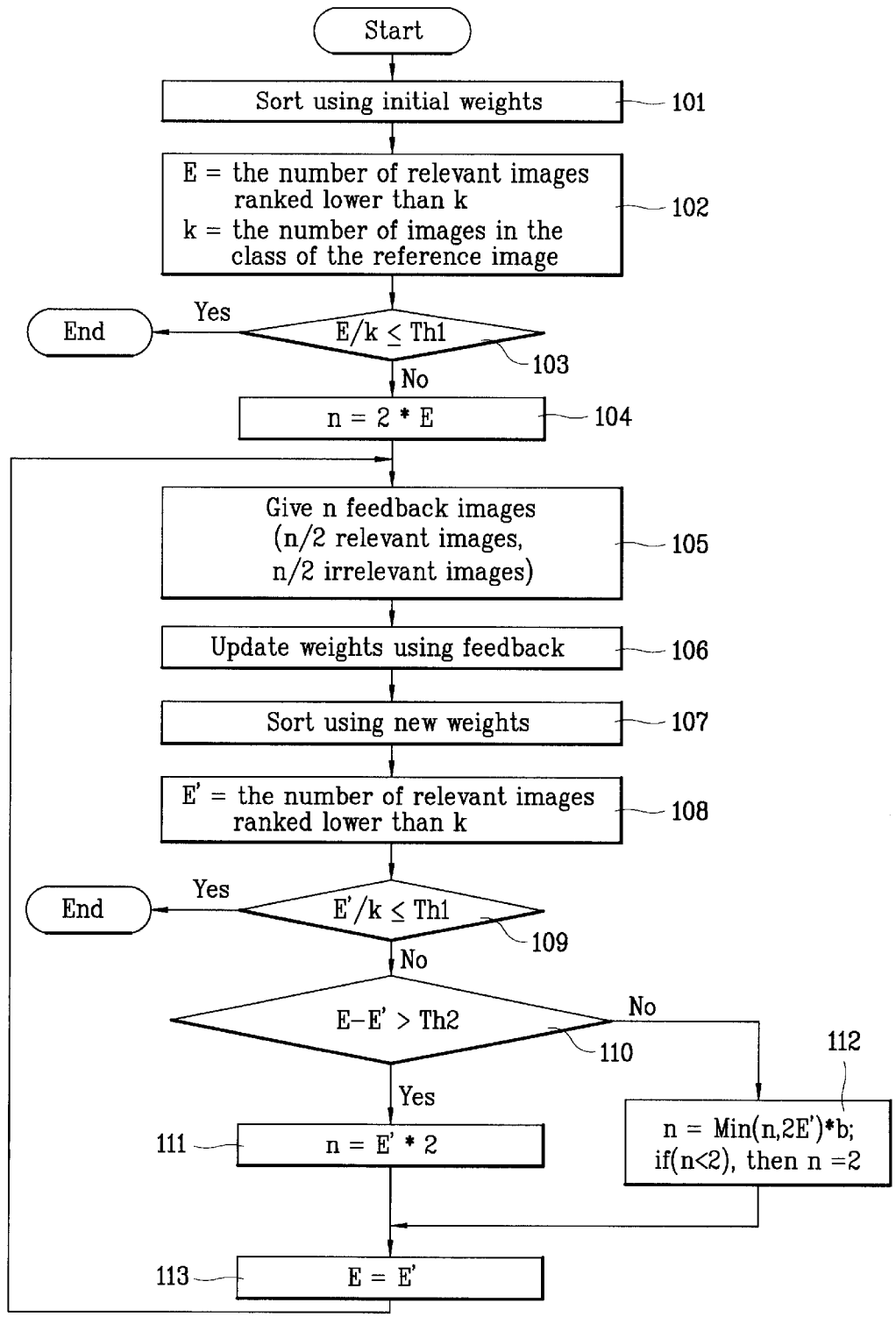
FIG. 1 is a flow chart for initiating a weight of a feature in a reference image according to the present invention.

Referring to FIG. 1, a search system searches for reference images in the same class among the images in a database using initial weights and sorts the detected images based upon a similarity value (step 101). For purposes of explanation, assume that the number of reference images in class A or the number of relevant images is 10, a first error threshold value TH1 is 0.1, and a second error threshold value TH2 is 0.5. FIG. 2 shows an example of the searching and sorting procedure of FIG. 1, in which a first round using initial weights results in a list of images {A, A, B, B, A, C, C, A, C, A, A, B, . . . } ranked from the highest to lowest relevance.

The search system then determines an error E (step 102), which is the number of relevant images ranked lower than the number of reference images k in class A. In round one of FIG. 2, k would be 10 and the number of relevant images A ranked lower than k is 5. Thus, the error E would be 5. The search system compares the degree of error E/k with the first threshold value TH1 (step 103). If the degree of error is less or equal to the threshold value TH1, the search procedure ends. Otherwise, if the degree of error E/k is greater than the threshold value TH1, the search system determines the number of feedback images n based on error E (step 104).

In round one of FIG. 2, the degree of error E/k=5/10=0.5. Since the degree of error 0.5 is greater than the first threshold value TH1 0.1, the system determines the number of feedback images n which is equal to 2*E, i.e. 2*5=10. Since n=10, the number of feedback images is determined as 10. Subsequently, n number of images are automatically fed back as the relevant images in class A (step 105). Here half of the feedback images would be the relevant images A ranked lower than k and the remaining half of the feedback images would be the irrelevant images ranked within k.

Thus, the search system updates corresponding weights of each feature in images using the feedback images (step 106). Subsequently, the search system re-searches for the reference image using the updated weight and re-sorts the detected images (step 107). The search system then re-determines an error E' in a list of ranked images (step 108). The results of one re-searching and re-sorting would correspond to round two in FIG. 2, where the error E' is 2.

Subsequently, the search system compares the degree of error E'/k with the first threshold value TH1=0.1 (step 109). If the degree of error is less than the first threshold value, the search procedure ends. Otherwise, if the degree of error is greater than the first threshold value, the procedure continues. In the example of FIG. 2, the degree of error in Round two is E'/k=2/10=0.2 and is greater than the first threshold value TH1 of 0.1. Thus the procedure continues.

Particularly, a determination is made whether a change, namely a decrease, in the degree of error is greater than the second threshold value TH2 (step 110). If a decrease in the degree of error is greater than or equal to the second threshold value TH2, the number of feedback images n is reset using the current error E' (step 111). On the other hand, if a decrease in the degree of error E–E' is not greater than the second threshold value TH2, the number of feedback images n is set to be a lower number than the number of previous feedback images (step 112).

Since the degree of error is greater than the first threshold value in Round 2 of FIG. 2 and the decrease of error E–E'=3 is greater than the second threshold value of 0.5, n=E'*2=4. Thus, the number of feedback images is four and the error E is reset to new error E' (step 113).

The procedure of searching and sorting using updated weights based on n feedback images, and determining an error E' (steps 105~108) repeats until the degree of error E'/k becomes less than or equal to the first threshold value TH1.

Therefore, in the example of FIG. 2, four images, two relevant images ranked below k and two irrelevant images ranked within k, would be fed back from Round 2; the weights would be updated using the four feedback images; and a searching and sorting of the detected images would produce Round 3. The error E' in Round 3 is again 2 and the degree of error E'/k=2/10=0.2. Since the degree of error is greater than TH1 and the decrease in the error E–E'=0 is not greater than TH2, the number of feedback images n is determined by step 112.

Namely, the number of feedback images n is the minimum of {n, 2E'} multiplied by a value of b, where b is greater than 0 but less than 1. Here, since n is smaller than 2E', n=n*b=2*0.5=1. However, if n is less than 2, n is set to a value of 2, as in this case. Thus, n=2, E is reset to E' and the procedure continues.

Accordingly, two images, one relevant image ranked below k and one irrelevant image ranked within k, would be fed back from Round 3; the weights would be updated using the two feedback images; and a searching and sorting of the detected images would produce Round 4. The error E' in Round 4 is 1 and the degree of error E'/k=1/10=0.1. Since the degree of error is equal to TH1, the procedure ends.

Note that in Round 3, there are two relevant images ranked below k and two irrelevant images ranked within k, while only one relevant image and one irrelevant image is fed back. In the preferred embodiment, the relevant image ranked lowest below k and the irrelevant image ranked highest within k is selected and fed back. Also, if a relevant image ranked below k but is ranked lower than a predetermined threshold value, said relevant image would not be included within the feedback images, i.e. is not fed back. In the present example, only the irrelevant image ranked within k may be fed back or the second lowest ranked relevant image which is not below the predetermined threshold value may be fed back rather than the lowest ranked relevant image.

In another example, assume that a search result of $\{A_1\ A_2\ B_3\ A_3\ A_4\ C_1\ B_2\ C_2\ C_3\ B_3\ A_5\ C_4\ A_6\ \ldots\ B_4\ C_5\ A_7\ C_6\}$ is obtain in round one when the number of relevant images A belonging to class A is 7. Generally, three irrelevant images $\{B_1\ C_1\ B_2\}$ and three relevant images $\{A_5\ A_6\ A_7\}$ should be fed back from round one. However, if the relevant image $A_7$ is ranked lower than a predetermined threshold value, $A_7$ would not be fed back because an adverse effect on the weight learning may be caused. As a result, five images or two irrelevant images and two relevant images may alternatively be fed back for round two. Here, the two feedback irrelevant images would be the highest ranked irrelevant images within k.

Furthermore, although the condition E–E'>TH2 has been used to determine how the number of feedback images n should be set in step 110, the condition may also be implemented by E*TH2'>E.' Namely, the condition determines how much an error in a current round has been reduced when compared with an error in a previous round, and may also be implemented by any other method. For example, for the condition E–E'>TH2, an error in the current round should be reduced by 30% or more if the second threshold value TH2 is set to a value of 0.3. Similarly, for the condition E*TH2'>E', an error in the current round should be reduced by 30% or more if the second threshold value TH2' is set to a value of 0.7.

Accordingly, step 110 ensures that a certain amount of error must be reduced between each rounds. By forcefully reducing the number of feedback images if the amount of error is not reduced by a certain amount, a more efficient weight learning is achieved. However, to simply the procedure, steps 110 and 112 may be omitted. In such case, if the degree of error E'/k is greater than TH1 in step 109, the number of feedback images n would be set directly by step 111 to E'*2.

Generally, the accuracy or precision of the search system as described depends on the number of feedback images, i.e. the value of k, and the number of times images are fed back, i.e. the number of rounds. The more the number of feedback images are used, the better the precision of the search system becomes. Also, the precision rises with the number of times images are fed back.

Figure 3:
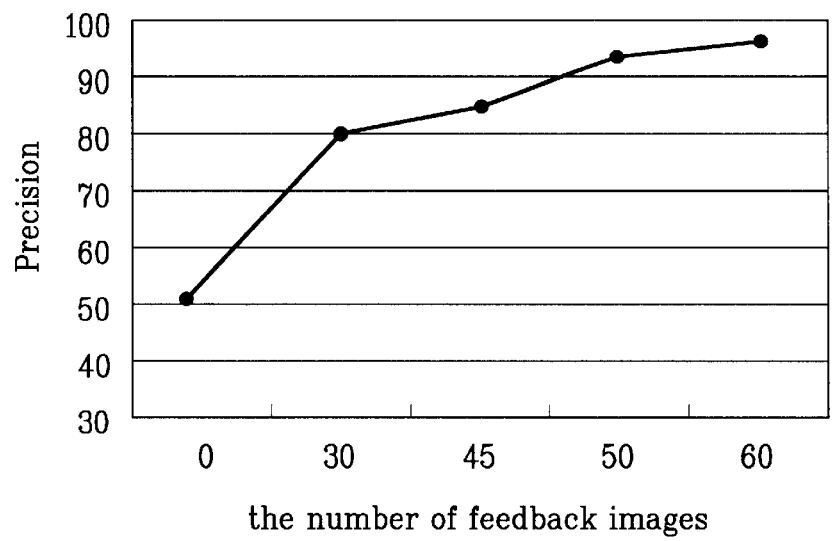
FIG. 3 is a graph showing a relationship between the number of images and the precision when a weight for a feature in a reference image is learned using the procedure of FIG. 1.
Figure 4:
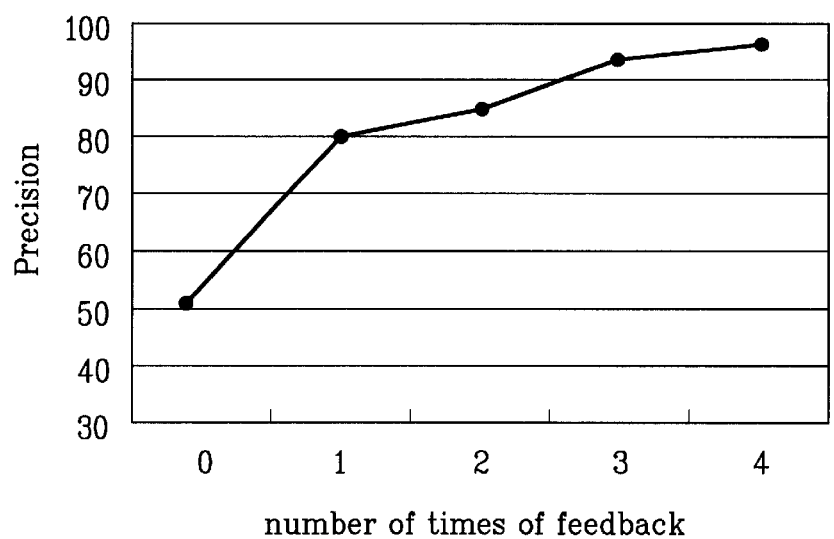
FIG. 4 is a graph showing a relationship between the number of feedbacks and the precision when a weight for a feature in a reference image is learned using the procedure of FIG. 1.

FIG. 3 is a graph showing a relationship between the number of feedback images and the precision achieved when weights for features in a reference image is learned using the procedure of FIG. 1, and FIG. 4 is a graph showing a relationship between the number of rounds and the precision achieved when weights for features in a reference image is learned using the procedure of FIG. 1. Note that the precision for a given image set is close to 100% for about 60 feedback images. Also, the precision for a given image set is close to 100% by four rounds of feedback.

Figure 5:
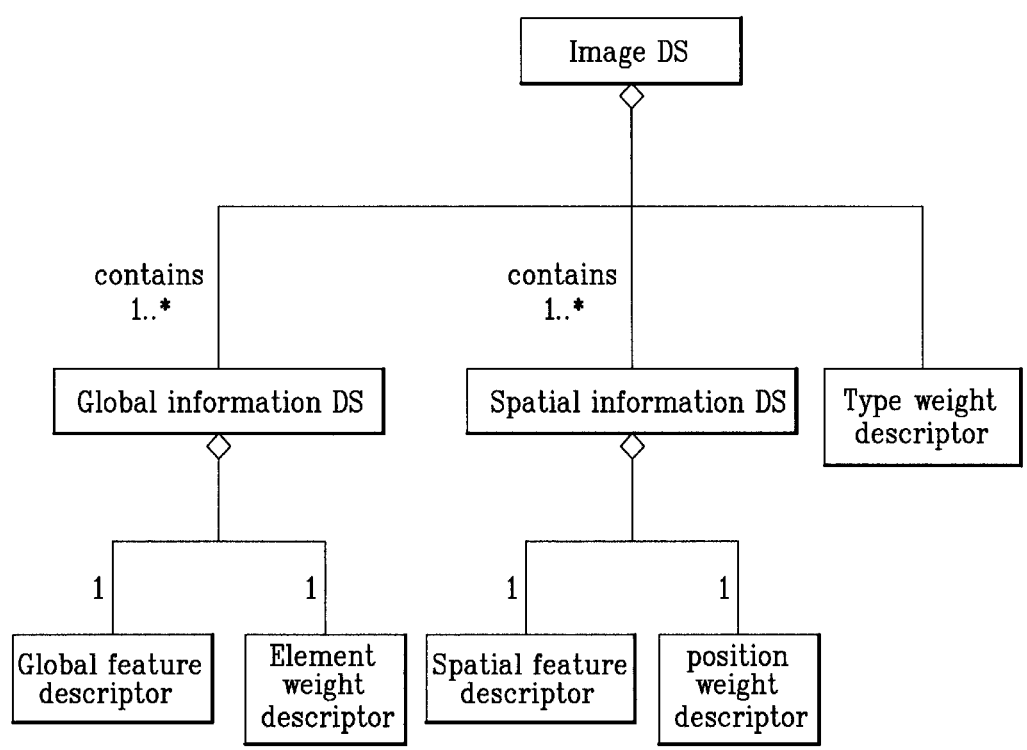
FIG. 5 shows a data structure for an image with initiated weights, according to the present invention.

Finally, FIG. 5 shows a data structure according to the present invention for an image with initiated weight when an image is searched.

Referring to FIG. 5, the present data structure includes global information which represents the whole image and spatial information which represents features in the image. In the data structure, weight information of a feature includes a type weight descriptor which represents an importance of the feature element, an element weight descriptor which represents an importance of elements depicted by a feature, and a position weight descriptor which represents regions of images including important information from the spatial information.

The weights are initiated according to the method described with reference to FIG. 1 and the data structure described with reference to FIG. 5 enables data searching operation using corresponding weights even if images are moved to different servers. Also, by initiating weights, other users can better update images using feedback. In addition, the initiated weights allows a more accurate search within a shorter amount of time. Thus, the present method improves the search performance by setting initial weights.

Furthermore, as described above, the present search system automatically determines feedback images from the search result. If an image is automatically fed back, a relative weight is calculated to update an existing weight using Equations 1 and 2 below.

$$W = \alpha \text{Sim}(R1, F1), \text{ if } F1 \text{ is a relevant image} \qquad [1]$$

$$W = \alpha \text{Dist}(R1, F1), \text{ if } F1 \text{ is an irrelevant image} \qquad [2]$$

In the above equations, R1 is a reference image, F1 is a feedback image, and a is a normal constant for each weight. The expression Sim( R1, F1) denotes a similarity between R1 and F1 using a feature k, an element e, and a position information p;

and Dist(R1, F1) denotes a dissimilarity between R1 and F1 using a feature k, an element e, and a position information p. Also, the value W may be one of a type weight Wk, an element weight We, or a position weight Wp.

Accordingly, if a feedback image is a relevant image, a weight is increased proportionately to the similarity between the reference image and the feedback image. If a feedback image is an irrelevant image, a weight is decreased proportionately to the similarity between the reference image and the feedback image. The resultant relative weight is added to the existing weight or updated by an algorithm which reflects the obtained relative weight.

In the present invention, a method in which images are grouped and weights of the grouped images are initiated has been suggested. As shown in FIG. 1, the learning performance can be improved even if the method in the related art for learning weights is applied after initializing the weights according to the present invention. For example, if a user searches for an reference image and similar image feedback information is obtained from a search result, since the feedback image information is equivalent to group information of a corresponding image, the feedback image is set as a group and the method of searching multimedia data of the present invention is performed such that repeated learning can be performed until the feedback images are all ranked at high levels.

Therefore, the present method of searching multimedia data has the following advantages. Weights of features which represent image characteristic are initiated using automatic feedback algorithm, so that a weight suitable for an image to be searched is automatically learned to effectively search a specific image. Furthermore, in the image search method of the present invention, a weight of a feature in a specific image is initially set so that the user can prevent the weight from being wrongfully learned by wrong feedback. Accordingly, the performance of the search system can be improved and the reliability of the search result can also be improved.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of searching multimedia data comprising:
    a1) grouping multimedia data in a database of a search system;
    b1) searching for reference multimedia data belonging to a group of k reference multimedia data and sorting the multimedia data obtained by the search, using initial weights of features in the reference group;
    c1) feeding back at least one multimedia data depending upon a degree of error determined concurrently among a combination of a plurality of the sorted multimedia data; and
    d1) updating said weights of features using said at least one feedback multimedia data.

2. A method of claim 1, wherein in (c1), automatically feeding back said at least one multimedia data.

3. A method of claim 1, further comprising:
    e1) searching for reference multimedia data belonging to the group and sorting the multimedia data obtained by the search using updated weights of features; and
    f1) repeating (c1) through (e1) until the degree of error in the sorted multimedia data meets a predetermined condition.

4. A method of claim 3, wherein in (c1), said at least one feedback multimedia data is either one of a reference multimedia data ranked below k or a non-reference multimedia data ranked within k.

5. A method of claim 4, wherein in (c1) feeding back a number of multimedia data equivalent to twice a number of reference multimedia data ranked below k.

6. A method of claim 5, wherein in (c1), feeding back less than a number of multimedia data equivalent to twice a number of reference multimedia data ranked below k, if the degree of error obtained (f1) did not decrease by a predetermined condition.

7. A method of claim 6, wherein at least one reference multimedia data and one non-reference multimedia data are fed back.

8. A method of claim 5, wherein the number of the reference multimedia data fed back is reduced to one reference multimedia data and one non-reference multimedia data through (f1).

9. A method of claim 1, wherein in (c1), said at least one feedback multimedia data is either one of a relevant multimedia data or an irrelevant multimedia data.

10. A method of claim 9, wherein in (d1), updating the weights of features proportionally to a similarity between said at least one feedback multimedia data and reference multimedia data, if said at least one feedback multimedia data is a relevant multimedia data; and updating the weights of features proportionally to a dissimilarity between said at least one feedback multimedia data and reference multimedia data, if said at least one feedback multimedia data is an irrelevant image.

11. A method of claim 9, wherein a relevant multimedia data is a reference multimedia data ranked below k and an irrelevant multimedia data is a non-reference multimedia data ranked within k.

12. A method of claim 11, wherein a reference multimedia data ranked lower below k is selected as a relevant multimedia data if more than one reference multimedia data is ranked below k but less than all reference multimedia data are fed back, and wherein a non-reference multimedia data ranked higher within k is selected as an irrelevant multimedia data if more than one non-reference multimedia data is ranked within k but less than all non-reference multimedia data are fed back.

13. A method of claim 12, wherein a reference multimedia data ranked lower than a predetermined threshold value below k is not selected as a relevant multimedia data.

14. A method of claim 11, wherein a reference multimedia data ranked lower than a predetermined threshold value below k is not fed back.

15. A method of claim of claim 9, wherein the number of the reference multimedia data is reduced if a decrease degree of a current error is lower than a predetermined threshold value.

16. The method of claim 1, wherein said updating comprises:
    calculating a relative weight W to update an existing weight of features, wherein the relative weight W is determined as follows:

$$W = \alpha \mathrm{Sim}(R1, F1), \text{ if } F1 \text{ is a relevant image} \quad [1]$$

$$W = \alpha \mathrm{Dist}(R1, F1), \text{ if } F1 \text{ is an irrelevant image,} \quad [2]$$

wherein R1 is a reference image, F1 is a feedback image, and $\alpha$ is a normal constant for each weight, wherein an expression Sim(R1, F1) denotes a similarity between R1 and F1 using a feature k, an element e, and a position information p, and wherein Dist(R1, F1) denotes a dissimilarity between R1 and F1 using a feature k, an element e, and a position information p.

17. The method of claim 16, wherein the relative weight W comprises one of a type weight Wk, an element weight We and a position weight Wp.

18. The method of claim 17, wherein a resultant relative weight is one of combined with the existing weight, added to the existing weight and modified by a prescribed function to correspond to a cumulative relative weight.

19. A computer software product that includes a medium readable by a processor, the medium having stored thereon:
    a global information representing a whole image;
    a spatial information representing features included in at least one portion of the image;
    a weight information of a feature representing an importance of the feature element, an importance of elements depicted by a feature, and a region of the image including importance information from the spatial information; and
    a sequence of instructions which when executed by said processor perform a search for reference multimedia data belonging to a group of k reference multimedia data and sort the multimedia data obtained by the search, using initial weights of features in the reference group and update the weights of features depending upon a degree of error determined among a plurality of the sorted multimedia data.

20. The computer software product of claim 19, wherein said sequence of instructions cause said processor to:
    calculate a relative weight W to update an existing weight of features, wherein the relative weight W is determined as follows:

$$W = \alpha \mathrm{Sim}(R1, F1), \text{ if } F1 \text{ is a relevant image} \quad [1]$$

$$W = \alpha \mathrm{Dist}(R1, F1), \text{ if } F1 \text{ is an irrelevant image,} \quad [2]$$

wherein R1 is a reference image, F1 is a feedback image, and $\alpha$ is a normal constant for each weight, wherein an expression Sim(R1, F1) denotes a similarity between R1 and F1 using a feature k, an element e, and a position information p, and wherein Dist(R1, F1)

denotes a dissimilarity between R1 and F1 using a feature k, an element e, and a position information p.

21. The computer software product of claim 20, wherein the relative weight W comprises one of a type weight Wk, an element We and a position weight Wp.

22. The computer software product of claim 21, wherein a resultant relative weight is one of combined with the existing weight, added to the existing weight and modified by a prescribed function to correspond to a cumulative relative weight.

23. A method of searching multimedia data comprising:
   a) searching for reference images belonging to a group of k reference images and sorting images obtained by the search, using initial weights of features in the group;
   b) feeding back at least one image depending upon a degree of error in a combination of the sorted images of the group of k reference images;
   c) updating said weights of features using said at least one feedback image; and
   d) re-searching for the reference images belonging to the group and re-sorting the images obtained by the search using updated weights of features.

24. A method of claim 23, wherein each image has a data structure comprising:
   a global information representing a whole image;
   a spatial information representing features included in at least one portion of the image; and
   a weight information of a feature representing an importance of the feature element, an importance of elements depicted by a feature, and a region of the image including important information from the spatial information.

25. A method of claim 24, wherein reference images are grouped into the group of k reference images in advance.

26. A method of claim 23, wherein reference images are grouped into the group of k reference images in advance.

27. A method of claim 24, comprising repeating (b) through (d) until the degree of error in the sorted images meets a predetermined condition.

28. A method of claim 23, comprising grouping images in a database of a search system.

29. A method of searching multimedia data comprising:
   a1) grouping multimedia data in a database of a search system;
   b1) searching for reference multimedia data belonging to a group of k reference multimedia data and sorting the multimedia data obtained by the search, using initial weights of features in the reference group;
   c1) feeding back at least one multimedia data depending upon a degree of error determined among a plurality of the sorted multimedia data;
   d1) updating said weights of features using said at least one feedback multimedia data;
   e1) searching for reference multimedia data belonging to the group and sorting the multimedia data obtained by the search using updated weights of features; and
   f1) repeating (c1) through (e1) until the degree of error in the sorted multimedia data meets a predetermined condition.

30. The method of claim 29, wherein said updating comprises:
   calculating a relative weight W to update an existing weight of features, wherein the relative weight W is determined as follows:

$$W = \alpha \text{Sim}(R1, F1), \text{ if } F1 \text{ is a relevant image} \qquad [1]$$

$$W = \alpha \text{Dist}(R1, F1), \text{ if } F1 \text{ is an irrelevant image,} \qquad [2]$$

wherein R1 is a reference image, F1 is a feedback image, and $\alpha$ is a normal constant for each weight, wherein an expression Sim(R1, F1) denotes a similarity between R1 and F1 using a feature k, an element e, and a position information p, and wherein Dist(R1, F1) denotes a dissimilarity between R1 and F1 using a feature k, an element e, and a position information p.

31. The method of claim 30, wherein the relative weight W comprises one of a type weight Wk, an element weight We and a position weight Wp.

32. The method of claim 31, wherein the resultant relative weight is one of combined with the existing weight, added to the existing weight and modified by a prescribed function to correspond to a cumulative relative weight.

33. A method of searching multimedia data comprising:
   a1) grouping multimedia data in a database of a search system;
   b1) searching for reference multimedia data belonging to a group of k reference multimedia data and sorting the multimedia data obtained by the search, using initial weights of features in the reference group;
   c1) feeding back at least one multimedia data depending upon a degree of error in the sorted multimedia data; and
   d1) updating said weights of features using said at least one feedback multimedia data, wherein updating the weights of features uses a first prescribed relationship to a similarity between said at least one feedback multimedia data and reference multimedia data, if said at least one feedback multimedia data is a relevant multimedia data; and updating the weights of features uses a second prescribed relationship to a dissimilarity between said at least one feedback multimedia data and reference multimedia data, if said at least one feedback multimedia data is an irrelevant image.

34. The method of claim 33, wherein the first and second prescribed relationships are each a proportional relationship.

35. The method of claim 33, wherein said updating comprises:
   calculating a relative weight W to update an existing weight of features, wherein the relative weight W is determined as follows:

$$W = \alpha \text{Sim}(R1, F1), \text{ if } F1 \text{ is a relevant image} \qquad [1]$$

$$W = \alpha \text{Dist}(R1, F1), \text{ if } F1 \text{ is an irrelevant image,} \qquad [2]$$

wherein R1 is a reference image, F1 is a feedback image, and $\alpha$ is a normal constant for each weight, wherein an expression Sim(R1, F1) denotes a similarity between R1 and F1 using a feature k, an element e, and a position information p, and wherein Dist(R1, F1) denotes a dissimilarity between R1 and F1 using a feature k, an element e, and a position information p.

36. The method of claim 35, wherein the relative weight W comprises one of a type weight Wk, an element weight We and a position weight Wp.

37. The method of claim 36, wherein a resultant relative weight is one of combined with the existing weight, added to the existing weight and modified by a prescribed function to correspond to a cumulative relative weight.

* * * * *